(12) United States Patent
Kato et al.

(10) Patent No.: US 8,863,973 B2
(45) Date of Patent: Oct. 21, 2014

(54) SEALING STRUCTURE

(71) Applicant: Honda Motor Co., Ltd., Tokyo (JP)

(72) Inventors: Koichi Kato, Saitama (JP); Koichi Takaku, Saitama (JP); Hiroyasu Ozaki, Saitama (JP); Taneaki Miura, Saitama (JP); Hikaru Okada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/956,840

(22) Filed: Aug. 1, 2013

(65) Prior Publication Data
US 2014/0034642 A1 Feb. 6, 2014

(30) Foreign Application Priority Data
Aug. 3, 2012 (JP) ................. 2012-172594

(51) Int. Cl.
*B65D 41/04* (2006.01)
*B65D 51/16* (2006.01)
*F16J 15/16* (2006.01)
*B65D 53/00* (2006.01)

(52) U.S. Cl.
CPC .............. *B65D 53/00* (2013.01); *F16J 15/166* (2013.01); *F16J 15/164* (2013.01)
USPC ...... 220/203.06; 220/303; 220/361; 220/601; 220/203.12; 220/203.19

(58) Field of Classification Search
CPC ................................ B65D 41/04; B65D 51/16
USPC ................. 220/288, 290, 303, 304, 360, 361, 220/366.1, 367.1, 212, 601, 661, 203.12, 220/203.13, 203.19, 203.11, 203.09, 202, 220/203.01, 203.04, 203.05, 203.06; 215/355, 356; 277/345, 346, 549, 579, 277/580, 582, 585, 586, 587, 589, 628, 637, 277/644, 590
See application file for complete search history.

(56) References Cited

U.S. PATENT DOCUMENTS

| | | | |
|---|---|---|---|
| 3,455,566 A * | 7/1969 | Hull et al. | 277/582 |
| 6,866,057 B1 * | 3/2005 | Buehrle, II | 137/74 |
| 7,516,963 B2 * | 4/2009 | Meller | 277/584 |
| 7,793,944 B2 * | 9/2010 | Otuka | 277/611 |
| 7,828,301 B2 * | 11/2010 | Briscoe et al. | 277/611 |
| 7,997,583 B2 * | 8/2011 | Nakahara | 277/390 |

FOREIGN PATENT DOCUMENTS

JP 2002-161983 A 6/2002

* cited by examiner

*Primary Examiner* — Steven A. Reynolds
*Assistant Examiner* — Javier A Pagan
(74) *Attorney, Agent, or Firm* — Squire Patton Boggs (US) LLP

(57) ABSTRACT

The object of the present invention is to provide a sealing structure which enables an insertion member to be removed easily from an inserted member. The sealing structure includes valve body, a mouth ring, an O-ring that is accommodated in an accommodation region formed by an inner peripheral surface of the mouth ring and an outer peripheral surface of the valve body, and prevents the fluid from leaking, and backup rings which are accommodated on both sides of the O-ring in the accommodation region, and restrict a movement of the O-ring. The valve body and the mouth ring are formed with screw parts to be fitted or screwed to each other when they are assembled, and first pressure release grooves are formed in the axial direction so as to extend at least on the inner peripheral surface of the mouth ring between the screw parts and the accommodation region.

5 Claims, 7 Drawing Sheets

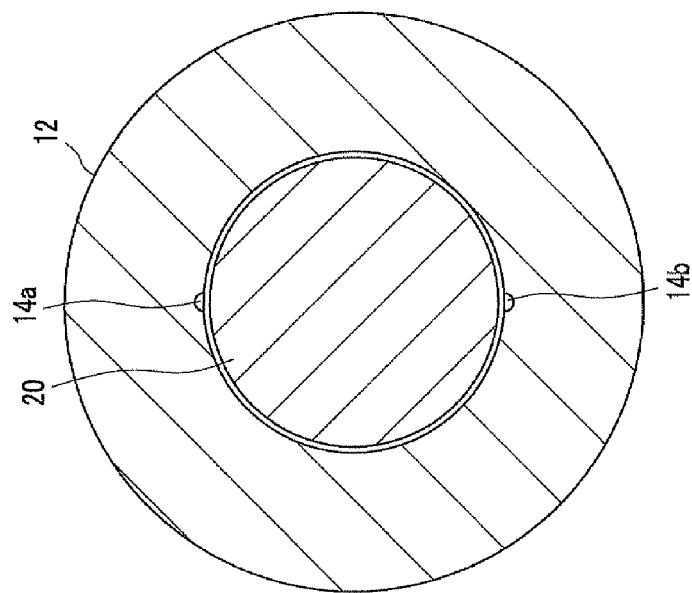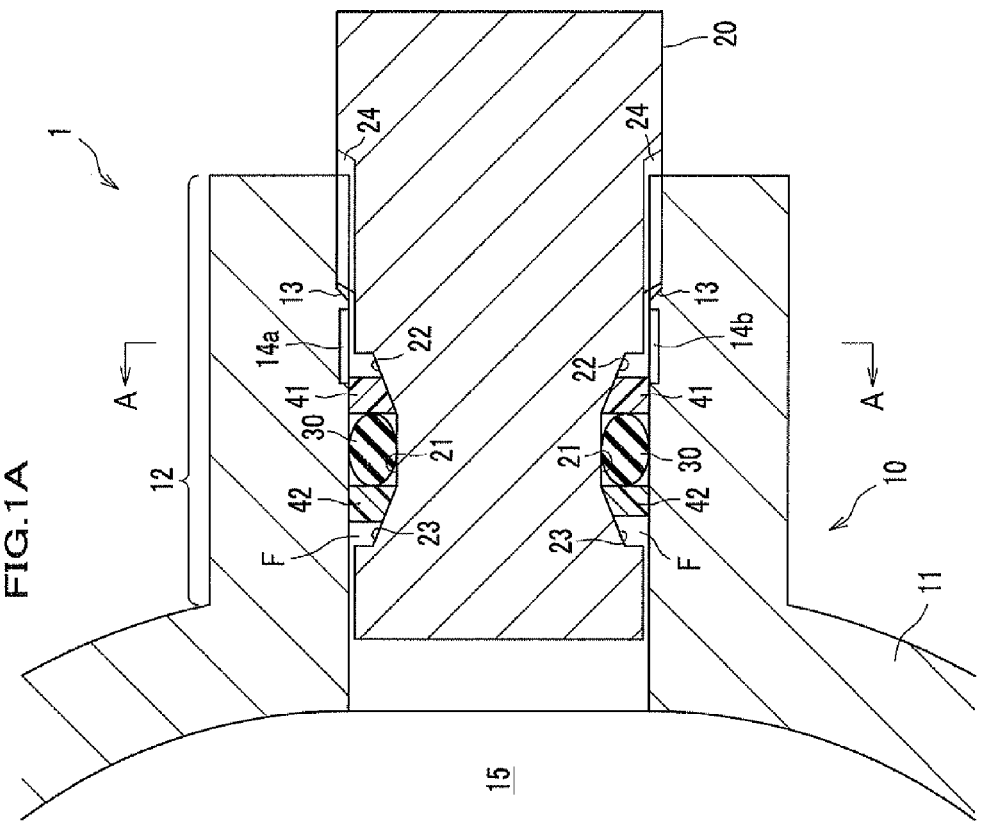

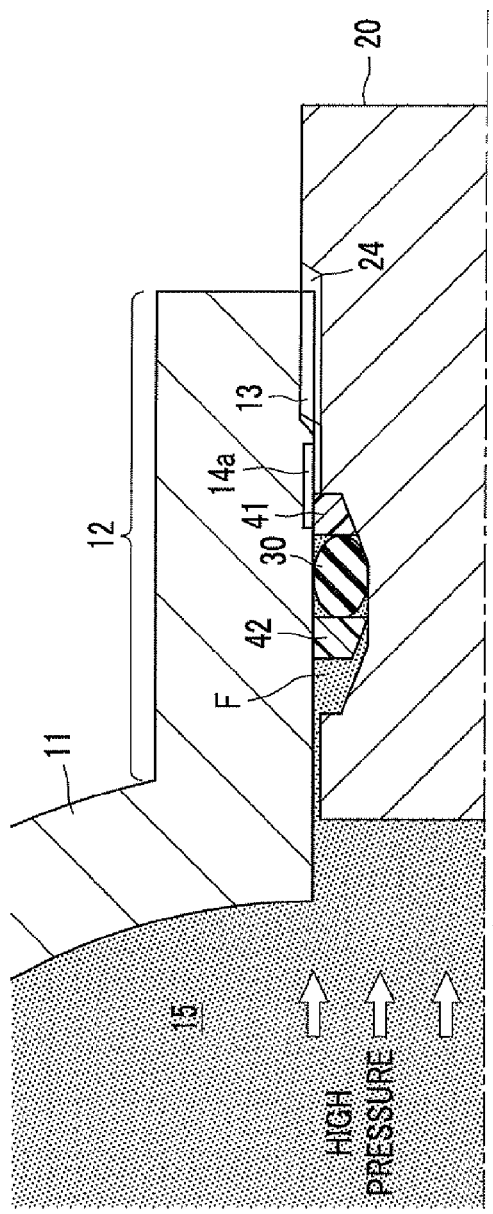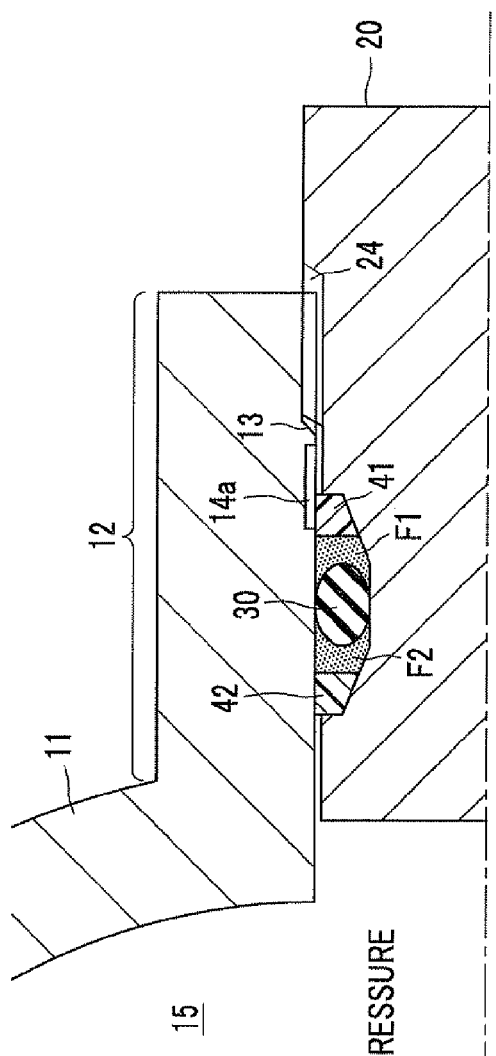

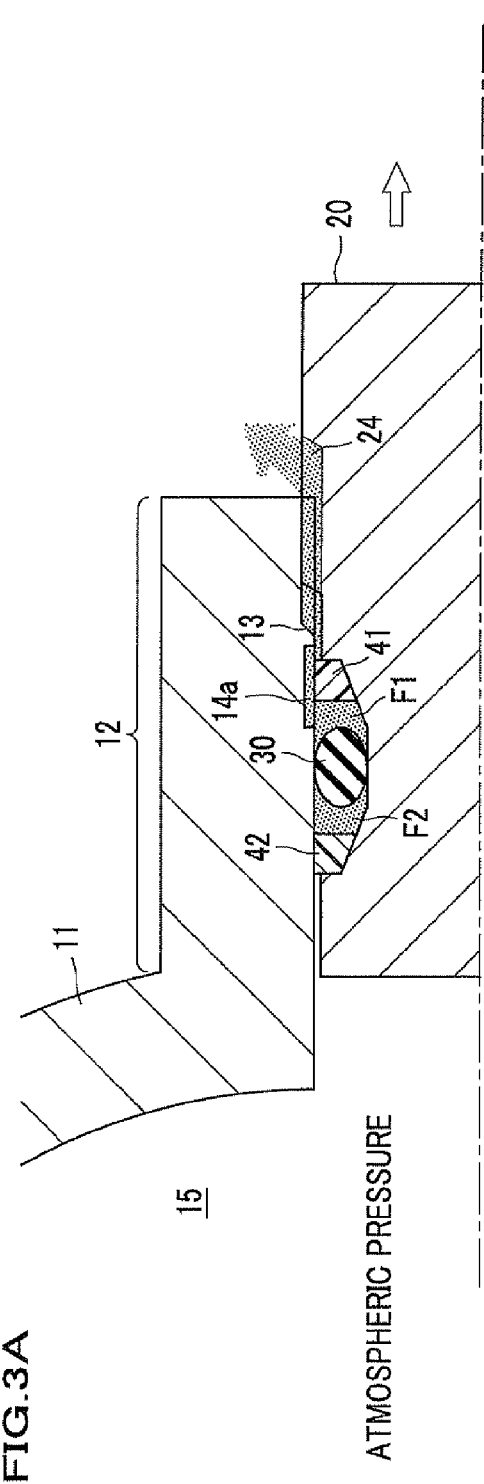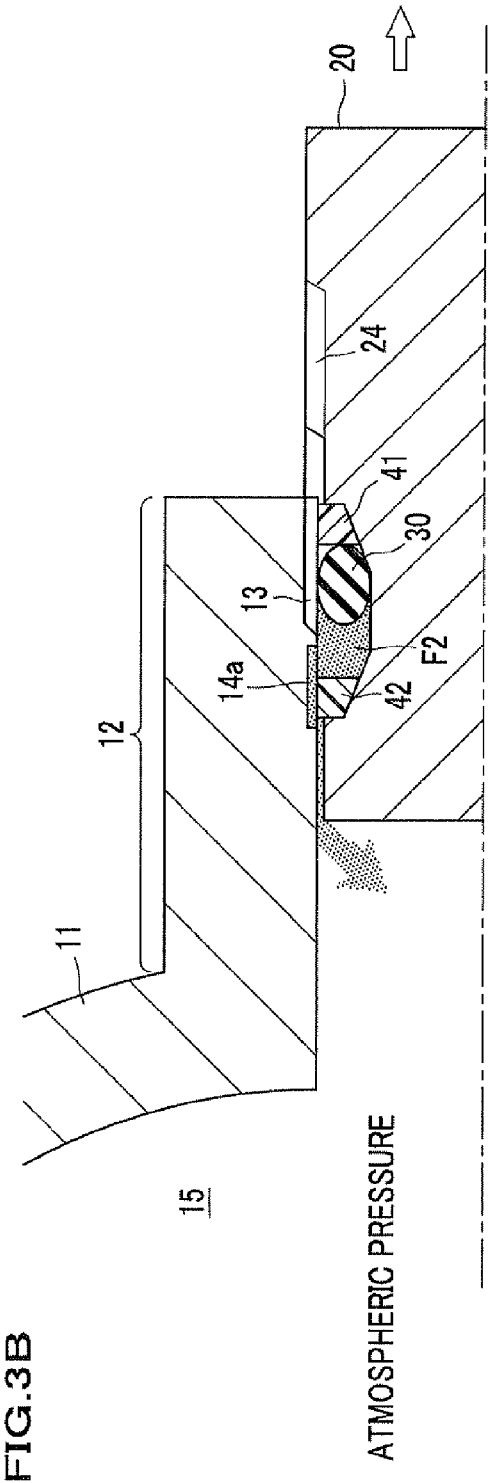

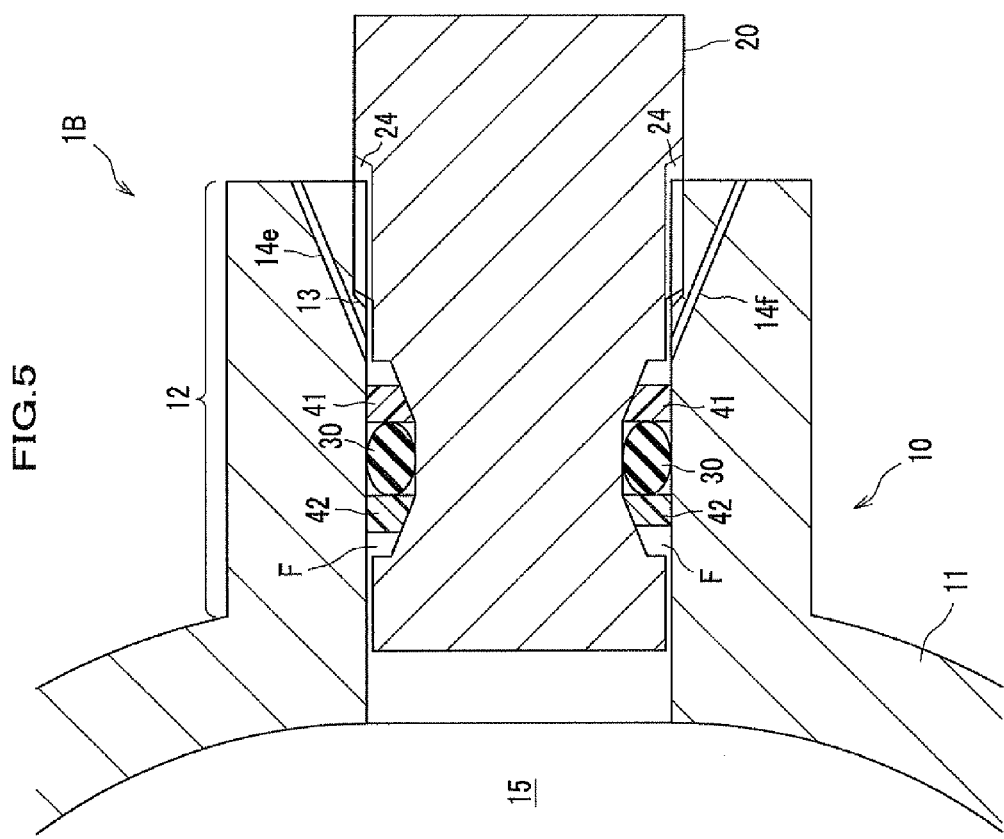

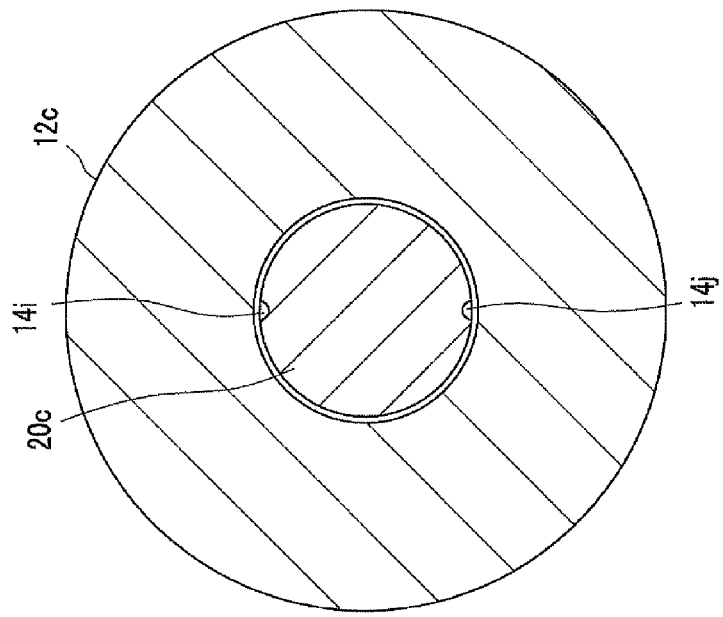
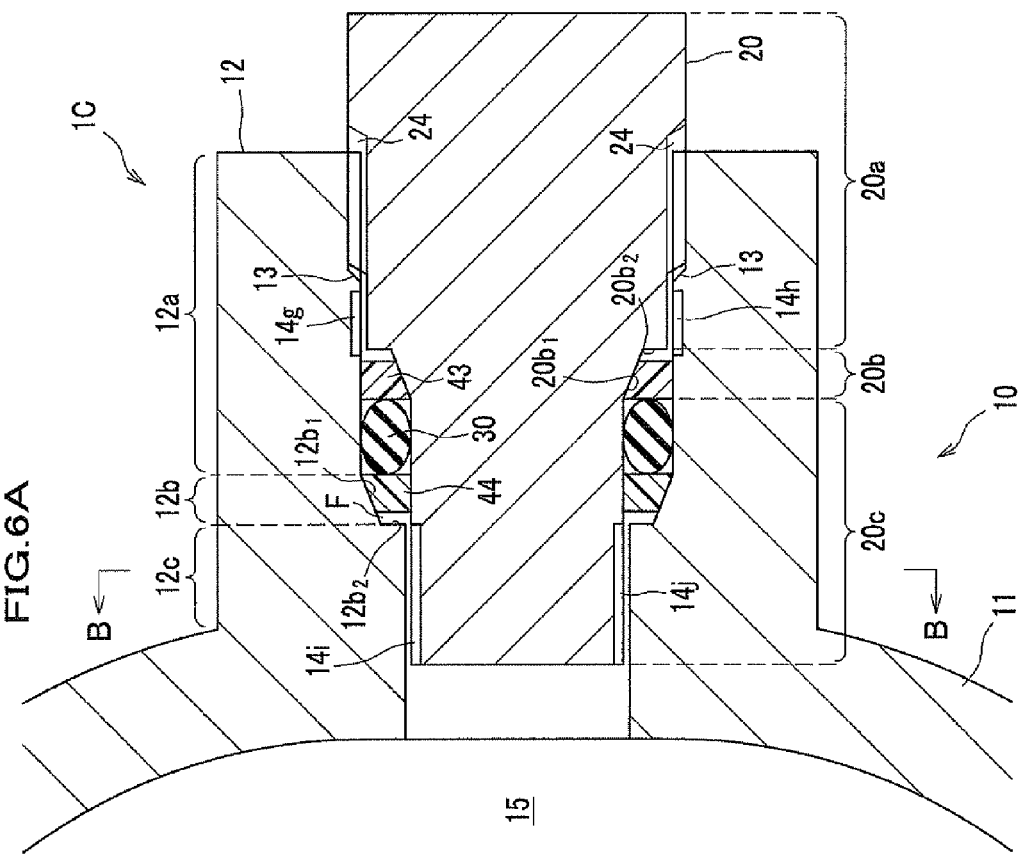
FIG.6A
FIG.6B

US 8,863,973 B2

SEALING STRUCTURE

CROSS REFERENCE TO RELATED APPLICATIONS

This application claims the foreign priority benefit under Title 35, United States Code, 119 (a)-(d) of Japanese Patent Application No. 2012-172594, filed on Aug. 3, 2012 in the Japan Patent Office, the disclosure of which is herein incorporated by reference in its entirety.

TECHNICAL FIELD

The present invention relates to a sealing structure that prevents a leakage of fluid by using an O-ring.

BACKGROUND OF THE INVENTION

In recent years, there has been developed a fuel cell vehicle rapidly, and as one method to extend a mileage, there has been developed a high-pressure hydrogen tank that supplies hydrogen to the fuel cell. Incidentally, the hydrogen tank has a columnar outer shape and one end thereof is formed with a cylindrical mouth ring (inserted member). Then, by inserting and screwing a valve body (insertion member) into the mouth ring, a filling chamber to seal high-pressure hydrogen is formed.

Further, an annular accommodation region is provided between the valve body and the mouth ring, and an O-ring made of rubber is mounted on the accommodation region in order to prevent a leakage of hydrogen. Furthermore, backup rings may be provided adjacent to the O-ring in order to prevent the O-ring from being damaged by biting into a gap between the valve body and the mouth ring.

Patent Document 1 (Japanese Patent Application Publication No. 2002-161983) describes a sealing device including a seal ring (O-ring) and two backup rings sandwiching the seal ring in an annular mounting groove provided on one member out of a housing (inserted member) and a shaft (insertion member) assembled coaxially with each other. In addition, the two backup rings are mounted so that inner peripheral surfaces thereof abut against tapered groove portions provided on both ends of the mounting groove.

SUMMARY OF INVENTION

According to the technology described in Patent Document 1, when the sealing device is filled with a high-pressure hydrogen and the seal ring accommodated in the mounting groove is pressurized with the high-pressure hydrogen, there is a possibility that the high-pressure hydrogen passes through the seal ring made of rubber. In this case, the backup ring disposed axially outward with respect to the seal ring (far side from the housing when assembling the shaft to the housing) is pressurized by the high-pressure hydrogen and pressed against the tapered groove portion, thereby sealing the hydrogen which has passed through the seal ring. Therefore, the hydrogen which has passed through the seal ring is accumulated in a sealing region between the seal ring and the backup ring, and the high-pressure hydrogen is sealed in the sealing region.

In general, the seal ring (O-ring) provided in the vicinity of a filling port of the hydrogen tank must be replaced periodically. Even if the filling chamber is depressurized when the shaft (insertion member) is removed from the housing (inserted member), the sealing of the backup ring is maintained by the accumulated high-pressure hydrogen. Consequently, according to the technology described in Patent Document 1, the high-pressure hydrogen continues to stay between the seal ring and the backup ring, and a friction force when removing the shaft from the housing is increased. Therefore, there is a problem that a torque when unscrewing the shaft from the housing (i.e., torque required to overcome the friction force) is increased, thereby deteriorating the workability.

Therefore, the object of the present invention is to provide a sealing structure which enables the insertion member to be removed easily from the inserted member.

To solve the above problem, a sealing structure according to the present invention is characterized in that the sealing structure includes an insertion member having a columnar outer shape, a cylindrical inserted member that is formed integrally with a filling chamber body in which a fluid is filled, and inserted with the insertion member, an O-ring that is accommodated in an accommodation region formed by an inner peripheral surface of the inserted member and an outer peripheral surface of the insertion member, and seals the fluid, in a state where the insertion member is inserted into the inserted member and assembled coaxially with the inserted member, and one or two backup rings which are accommodated on both sides or axially outward of the O-ring in the accommodation region, and restrict a movement of the O-ring, wherein the insertion member and the inserted member are partially formed with assembling parts to be fitted or screwed to each other when they are assembled, and a first pressure release groove is formed in the axial direction so as to extend at least on the inner peripheral surface of the inserted member between the assembling part and the accommodation region, and communicates with an external space via a gap between the assembling parts.

According to such a configuration, when the insertion member is removed from the inserted member, and one end of the first pressure release groove faces the accommodation region beyond the backup ring accommodated on the axially outward of the O-ring (far side from the insertion member when assembling the insertion member to the inserted member), the accommodation region is depressurized in the following manner. That is, a space between the O-ring and the backup ring (region where a high-pressure fluid stays) communicates with the external space via the gap between the assembling parts and the first pressure release groove. Here, the gap between the assembling parts means a gap formed between the assembling part formed in the insertion member and the assembling part formed in the inserted member. Then, by the communication, the high-pressure fluid is discharged to the external space via the gap between the assembling parts and the first pressure release groove. Therefore, the pressure in the accommodation region becomes substantially equal to the pressure in the external space, so that a friction force when removing the insertion member from the inserted member is reduced. Therefore, it is possible to easily remove the insertion member from the inserted member.

Further, in the sealing structure, one end of the first pressure release groove is preferably adjacent to the accommodation region, in the state where the insertion member is inserted into the inserted member and assembled coaxially with the inserted member.

According to such a configuration, when the insertion member is moved axially outward, one end of the first pressure release groove faces the accommodation region in a short moving distance. Here, "axially outward" means a direction in which the insertion member is away from the inserted member. Therefore, when removing the insertion member from the inserted member, it is possible to reduce an amount of work required for the high-pressure fluid sealed in the accommodation region to be discharged (i.e., depressurized) to the external space, thereby improving the workability.

An another aspect of the sealing structure according to the present invention is characterized in that the sealing structure includes an insertion member having a columnar outer shape, a cylindrical inserted member that is formed integrally with a filling chamber body in which a fluid is filled, and inserted with the insertion member, an O-ring that is accommodated in an accommodation region formed by an inner peripheral surface of the inserted member and an outer peripheral surface of the insertion member, and seals the fluid, in a state where the insertion member is inserted into the inserted member and assembled coaxially with the inserted member, and one or two backup rings which are accommodated on both sides or axially outward of the O-ring in the accommodation region, and restrict a movement of the O-ring, wherein the insertion member and the inserted member are partially formed with assembling parts to be fitted or screwed to each other when they are assembled, and a pressure release bore is formed so as to open to the inner peripheral surface of the inserted member between the assembling part and the accommodation region, and communicate with an external space.

According to such a configuration, in a process where the insertion member is removed from the inserted member, one end of the pressure release bore faces the accommodation region beyond the backup ring accommodated on the axially outward of the O-ring. Then, the space between the O-ring and the backup ring (region where the high-pressure fluid stays) communicates with the external space via the pressure release bore. By the communication, the high-pressure fluid is discharged to the external space via the pressure release bore. As a result, the pressure in the accommodation region becomes substantially equal to the pressure in the external space, so that the friction force when removing the insertion member from the inserted member is reduced. Therefore, it is possible to easily remove the insertion member from the inserted member.

Furthermore, in the sealing structure, the opening of the pressure release bore is preferably adjacent to the accommodation region, in the state where the insertion member is inserted into the inserted member and assembled coaxially with the inserted member.

According to such a configuration, when the insertion member is moved axially outward, one end of the pressure release bore faces the accommodation region in a short moving distance. Therefore, when removing the insertion member from the inserted member, it is possible to reduce the amount of work required for the high-pressure fluid sealed in the accommodation region to be discharged (i.e., depressurized) to the external space, thereby improving the workability.

Furthermore, in the sealing structure, the insertion member preferably includes a large diameter column portion and a small diameter column portion that is formed integrally with the large diameter column portion via a step portion and has a smaller diameter than the large diameter column portion, the inserted member preferably includes a large inner diameter cylinder portion of an inner diameter corresponding to a diameter of the large diameter column portion and a small inner diameter cylinder portion that is formed integrally with the large inner diameter cylinder portion via a step portion and has an inner diameter corresponding to a diameter of the small diameter column portion, the accommodation region is preferably formed in a state where the insertion member is inserted into the inserted member and assembled coaxially with the inserted member, from a state where an end portion of the small diameter column portion of the insertion member and an end portion of the large inner diameter cylinder portion of the inserted member face each other, and a second pressure release groove that has one end thereof facing the inside of the filling chamber body and the other end thereof provided on the axially inward from the accommodation region, is preferably formed in the axial direction on the outer peripheral surface of the small diameter column portion of the insertion member.

According to such a configuration, when the insertion member is moved axially outward relative to the inserted member, and one end of the second pressure release groove faces the accommodation region beyond the backup ring accommodated axially inward of the O-ring, the accommodation region is depressurized in the following manner. That is, the space between the O-ring and the backup ring (region where the high-pressure fluid stays) communicates with the inside of the filling chamber body via the second pressure release groove. Therefore, when the insertion member is removed from the inserted member, the fluid staying in the sealing region is discharged to the filling chamber of relatively low pressure by depressurizing in advance the inside of the filling chamber body. Therefore, it is possible to easily remove the insertion member from the inserted member.

According to the present invention, it is possible to provide a sealing structure which enables the insertion member to be removed easily from the inserted member.

BRIEF DESCRIPTION OF DRAWINGS

FIG. 1A is a cross-sectional view of a sealing structure according to a first embodiment of the present invention, and specifically, the cross-sectional view taken along a plane including a central axis in a state where a valve body is assembled to a mouth ring.

FIG. 1B is a cross-sectional view of the sealing structure according to the first embodiment of the present invention, and specifically, the cross-sectional view taken along and seen from a line A-A in FIG. 1A.

FIG. 2A is an end view taken along the plane including the central axis in a state where the valve body is assembled to the mouth ring, and specifically, the end view in a state where a filling chamber is filled with a high-pressure hydrogen.

FIG. 2B is an end view taken along the plane including the central axis in a state where the valve body is assembled to the mouth ring, and specifically, the end view in a state where the filling chamber is depressurized so that a pressure of hydrogen therein is substantially equal to the atmospheric pressure.

FIG. 3A is an end view taken along the plane including the central axis in a state where the valve body is pulled out from the mouth ring by a predetermined distance, and specifically, the end view in a state where one end of a first pressure release groove faces an accommodation region on the axially inward from a first backup ring.

FIG. 3B is an end view taken along the plane including the central axis in a state where the valve body is pulled out from the mouth ring by a predetermined distance, and specifically, the end view in a state where the other end of the first pressure release groove faces an accommodation region on the axially outward from a second backup ring.

FIG. 5 is a cross-sectional view taken along a plane including a central axis in a state where a valve body is assembled to a mouth ring in a sealing structure according to a third embodiment of the present invention.

FIG. 6A is a cross-sectional view of a sealing structure according to a fourth embodiment of the present invention, and specifically, the cross-sectional view taken along a plane including a central axis in a state where a valve body is assembled to a mouth ring.

FIG. 6B is a cross-sectional view of the sealing structure according to the fourth embodiment of the present invention, and specifically, the cross-sectional view taken along and seen from a line B-B in FIG. 6A.

DESCRIPTION OF EMBODIMENTS

Figure 4:
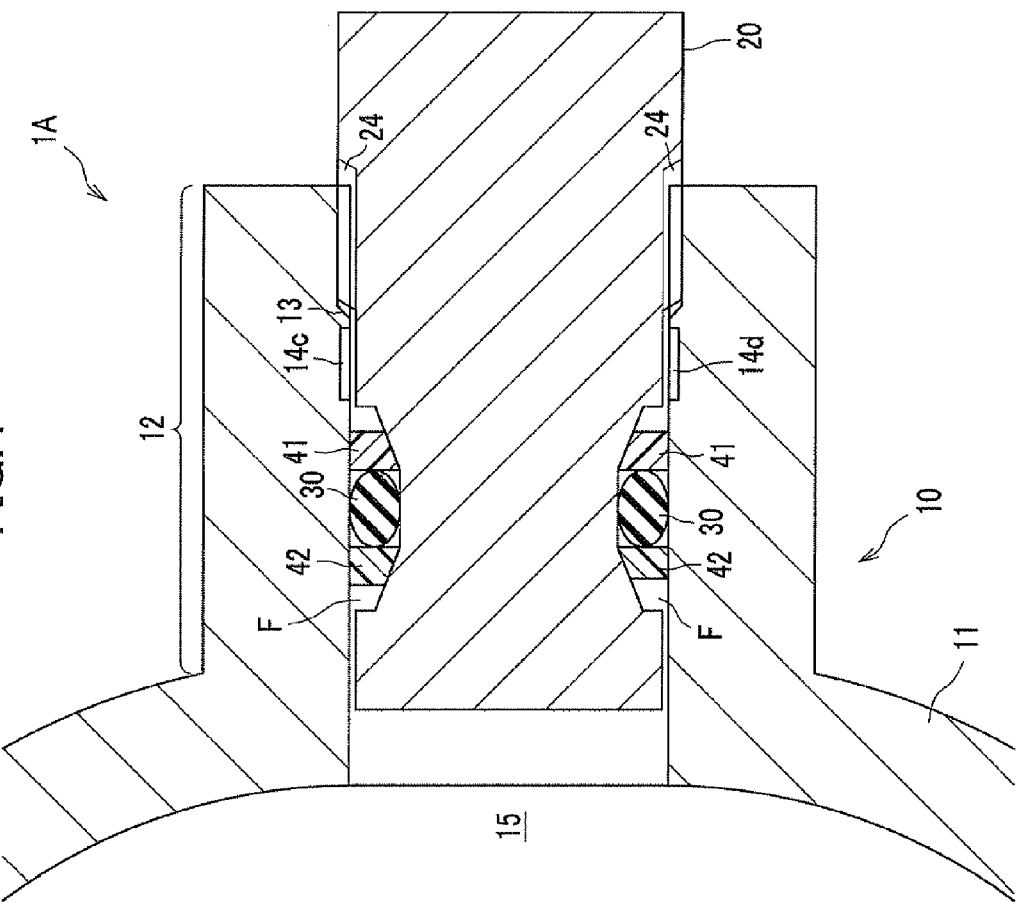
FIG. 4 is a cross-sectional view taken along a plane including a central axis in a state where a valve body is assembled to a mouth ring in a sealing structure according to a second embodiment of the present invention.

Embodiments for carrying out the present invention (hereinafter, referred to as the embodiments) will be described in detail with reference to accompanying drawings. In each drawing, an O-ring 30, a first backup ring 41, and a second backup ring 42 are illustrated slightly bigger than those actually used.

<Configuration of a Sealing Structure>

FIG. 1A is a cross-sectional view taken along a plane including a central axis in a state where a valve body is assembled to a mouth ring. For example, a sealing structure 1 is used as a hydrogen tank which is a hydrogen source for a fuel cell (not shown) generating power by an electrode reaction between oxygen and hydrogen mounted on a vehicle. Note that a usage of the sealing structure is not limited to this, and the sealing structure may be used as the hydrogen source for a stationary fuel cell, for example.

As shown in FIG. 1A, the sealing structure includes a tank body 10, a valve body 20, the O-ring 30, the first backup ring 41, and the second backup ring 42. A cylindrical mouth ring 12 extending to the axially outward from one end portion of the tank body 10 is coaxially screwed with the valve body 20. Hereinafter, a central axis when the mouth ring 12 and the valve body 20 are screwed (or unscrewed) is simply referred to as "central axis" or "axis".

The tank body is made of metal such as aluminum alloy and includes a filling chamber body 11 and the mouth ring 12. However it is not shown, the entire tank body 10 except a part of the mouth ring 12 is reinforced against pressure by a carbon fiber reinforced resin or the like. The filling chamber body 11 has a columnar outer shape, and is a shell-like member having a filling chamber 15 therein. Incidentally, the filling chamber 15 is filled with high-pressure hydrogen (fluid).

<Mouth Ring (Inserted Member)>

The mouth ring 12 is a cylindrical member extending to the outside in the axial direction from one end portion of the filling chamber body 11, and formed integrally with the filling chamber body 11. The axial direction corresponds to a longitudinal direction of the columnar tank body 10. In addition, the outside in the axial direction corresponds to the side of the external space (right side in FIG. 1A), and the inside in the axial direction corresponds to the side of the filling chamber 15 (left side in FIG. 1A).

An inner peripheral surface on the axially outward of the mouth ring 12 is partially formed with a female screw part 13 (assembling part) for screwing with the valve body 20. Further, two strips of first pressure release grooves 14a, 14b extending in the axial direction are formed on the inner peripheral surface of the mouth ring 12. Note that the two strips of first pressure release grooves 14a, 14b are provided in positions axisymmetric with each other with respect to the central axis described above.

As described above, when the O-ring 30 accommodated in an accommodation region F is pressurized by the high-pressure hydrogen in the filling chamber 15, the high-pressure hydrogen passes through the O-ring 30 made of rubber. Then, the first backup ring 41 is pressurized by the high-pressure hydrogen and pressed against a tapered surface of the valve body 20. As a result, the hydrogen passed through the O-ring 30 stays in a sealing region between the O-ring and the first backup ring 41, so that the high-pressure hydrogen is sealed in the sealing region. The first pressure release grooves 14a, 14b shown in FIG. 1A are provided for discharging and depressurizing the high-pressured hydrogen sealed in the sealing region to the external space, when the valve body 20 is removed from the mouth ring 12. Hereinafter, one first pressure release groove 14a will be described, but the other first pressure release groove 14b will be the same.

FIG. 1B is a cross-sectional view taken along and seen from a line A-A in FIG. 1A. As shown in FIG. 1B, the first pressure release groove 14a is a long bore drilled radially outward on the inner peripheral surface of the mouth ring 12, and extends in the axial direction. Incidentally, the cross-sectional surface of the first pressure release groove 14a is a smooth circumferential surface (see FIG. 1B), but the cross-sectional surface of the first pressure release groove 14a may have other shapes such as a rectangular shape.

Further, the first pressure release groove 14a has one end thereof (axial inside end portion) provided so as to face the accommodation region F. The accommodation region F means an annular accommodation region which is formed by the inner peripheral surface of the mouth ring 12 and an annular accommodation groove provided on the outer peripheral surface of the valve body 20 and recessed radially inward. When removing the valve body 20 from the mouth ring 12, by allowing one end of the first pressure release groove 14a to face the accommodation region F, it is possible to have a sealing region F1 communicate with the first pressure release groove 14a in a short moving distance (see FIG. 3), thereby depressurizing the sealing region F1.

Furthermore, the one end of the first pressure release groove 14a is provided so as not to face the sealing region F1, in a state where the valve body 20 and the mouth ring 12 are screwed with each other, and the first backup ring 41 is pressurized to the axially outward by the high-pressure hydrogen (see FIG. 2A). In this manner, in a normal use of the tank body 10 when the valve body 20 and the mouth ring 12 are screwed with each other, the high-pressure hydrogen is prevented from flowing into the first pressure release groove 14a.

The other end (axial outside end portion) of the first pressure release groove 14a is located axially inward from the female screw part 13, so that the first pressure release groove 14a does not reach the female screw part 13. Thus, the female screw part 13 (assembling part) of the mouth ring 12 and a male screw part 24 (assembling part) of the valve body 20 are adapted to have an enough assembling strength. Incidentally, the first pressure release groove 14a communicates with the external space in a state where the valve body 20 is screwed with the mouth ring 12. This is because there is a spiral gap formed between the male screw part 24 formed on the outer peripheral surface of the valve body 20 and the female screw part 13 formed on the inner peripheral surface of the mouth ring 24.

Further, the first pressure release groove 14a is formed so that the axial length thereof is longer than the axial length (thickness) of the backup ring 41. Thus, when the valve body 20 is removed from the mouth ring 12, the first pressure release groove 14a is in a state of straddling the first backup ring 41 in the axial direction, so that the sealing region F1 (see FIG. 3A) and the first pressure release groove 14a can communicate with each other, thereby depressurizing the sealing region F1. The details of the pressure release through the first pressure release groove 14a will be described later.

<Valve Body (Insertion Member)>

The valve body 20 has a columnar outer shape having an outer peripheral surface of substantially stepped. Note that, in order to simplify the description, the valve body 20 is illustrated to have a solid configuration, but in practice, a discharge path (not shown) for allowing the filling chamber 15 to communicate with the outside and discharging the hydrogen is formed in the valve body 20. In addition, a valving element (not shown) for opening and closing an opening of the discharge path described above, a plunger (not shown) for reciprocating the valving element in the axial direction, a solenoid (not shown), and the like are disposed.

As shown in FIG. 1A, the valve body 20 has the outer peripheral surface partially formed with annular accommodation grooves (correspond to reference numerals 21 to 23) recessed radially inward. In addition, the accommodation grooves includes a first annular bottom surface 21 which is parallel to the axial direction, a second bottom surface 22 and a third bottom surface 23 which are connected to the first bottom surface 21. The second bottom surface 22 is an annular tapered surface of a diameter which becomes large gradually axially outward and connected to an annular wall surface which is perpendicular to the axial direction. The third bottom surface 23 is an annular tapered surface of a diameter which becomes large gradually axially inward and connected to an annular wall surface which is perpendicular to the axial direction.

Then, in the state where the valve body 20 and the mouth ring 12 are screwed with each other, the accommodation region F is formed by the accommodation grooves (outer peripheral surface) of the valve body 20 and the inner peripheral surface of the mouth ring 12. Note that the O-ring 30, the first backup ring 41, and the second backup ring 42 are accommodated in the accommodation region F. Further, the valve body 20 has the outer peripheral surface which is on the axially outward from the accommodation groove and partially formed with the male screw part 24 (assembling part) for screwing the valve body 20 to the mouth ring 12.

As shown in FIG. 1B, the valve body 20 has a diameter designed to be slightly smaller than an inner diameter of the mouth ring 12 except the accommodation groove thereof. Therefore, in the state where the valve body 20 and the mouth ring 12 are screwed with each other, there is an annular gap between the mouth ring 12 and the valve body 20.

<O-Ring>

The O-ring 30 has a circular sectional side view (cross-section taken along a plane including the central axis) in a state when not being pressed from the outside, and is composed of a rubber-like elastic member, for example. In the state where the valve body 20 and the mouth ring 12 are screwed with each other, the O-ring 30 is accommodated in the accommodation region F formed between the inner peripheral surface of the mouth ring 12 and the accommodation groove (outer peripheral surface) of the valve body 20. In this state, the O-ring is radially compressed and deformed by the accommodation groove and the inner peripheral surface of the mouth ring 12. In this manner, a sealing function of the O-ring 30 is maintained satisfactorily, thereby preventing the hydrogen from leaking to the outside.

<First and Second Backup Rings>

The first backup ring 41 and the second backup ring 42 are annular members for restricting the O-ring 30 from moving to the axial direction in the accommodation region F, and made of a hard material such as a fluorine resin, a polyamide resin, a hard rubber, and a light metal. That is, the first backup ring 41 and the second backup ring 42 are made of a material which is hardly deformed or not deformed, even if so-called alternating pressure is applied thereto by a variation of the hydrogen pressure in the filling chamber 15.

The first backup ring 41 is disposed on the axially outward of the O-ring 30 so as to be adjacent to the O-ring 30. The first backup ring 41 has a trapezoidal sectional side view having an inclined surface on the inside in the radial direction. When the hydrogen in the filling chamber 15 has a high pressure, the first backup ring 41 is pressed to the outside in the axial direction. Then, the inner peripheral surface (inclined surface) of the first backup ring 41 is in close contact with the second bottom surface 22 (tapered surface) of the accommodation groove, and the outer peripheral surface of the first backup ring 41 is in close contact with the inner peripheral surface of the mouth ring 12. In this manner, the O-ring 30 is prevented from biting into the gap between the mouth ring 12 and the valve body 20, so that the circumferential surface of the O-ring 30 is not damaged.

The second backup ring 42 is the same as the first backup ring 41, and is disposed on the axially inside of the O-ring 30 so as to be adjacent to the O-ring 30. When the hydrogen in the filling chamber 15 has a low pressure, the second backup ring 42 is pressed to the inside in the axial direction, and restricted from moving to the inside in the axial direction by the third bottom surface 23 (tapered surface) of the accommodation groove.

In this manner, the backup rings are disposed so as to sandwich the O-ring in the axial direction, so that the O-ring is not damaged when the alternating pressure is applied thereto. The first backup ring 41 and the second backup ring 42 may be rings having ends or endless rings.

<Pressure Release Via the Pressure Release Groove>

Next, the pressure release when the valve body 20 is unscrewed from the mouth ring 12 will be described sequentially with reference to FIGS. 2 and 3. FIG. 2A is an end view in a state where a filling chamber is filled with a high-pressure hydrogen. In other words, FIG. 2A shows a state pressurized axially outward from the filling chamber 15 when the valve body 20 and the mouth ring 12 are screwed with each other.

In this state, the high-pressure hydrogen flows into the accommodation region F via the annular gap between the mouth ring 12 and the valve body 20. Then, the first backup ring 41, the O-ring 30, and the second backup ring 42 are pressed axially outward by a pressure of the high-pressure hydrogen.

Incidentally, the hydrogen pressure in the filling chamber 15 increases rapidly in some cases (for example, a pressure difference between before and after the increase of the hydrogen pressure is 70 MPa), and the sealing effect by the first backup ring 41 is exhibited remarkably by such a rapid increase of the hydrogen pressure. Further, the O-ring 30 is compressed and deformed in the radial direction. Therefore, in the state shown in FIG. 2A, there is the sealing region F1 between the O-ring 30 and the first backup ring 41. Furthermore, as described above, the hydrogen passes through the O-ring 30 if the state where the high pressure is applied from the filling chamber 15 continues. Then, the high-pressure hydrogen flows into and stays in the sealing region described above. As a result, the sealing region F1 between the O-ring and the first backup ring 41 is in a state where the high-pressure hydrogen is sealed therein.

Note that, in a state shown in FIG. 2A, an end of the axial inside of the first pressure release groove 14a is at a position not beyond the first backup ring 41 which is pressed axially outward (i.e., position not reaching the sealing region described above). Therefore, the high-pressure hydrogen does not flow into the first pressure release groove 14a in this state. Further, as described above, since the first pressure release groove 14a is formed in the axial direction (see FIGS. 2A and 2B), a ratio of an area occupied by the first pressure release groove 14a to the inner peripheral surface of the mouth ring 12, which the first backup ring 41 is in close contact with, is small. Therefore, there is no possibility that the outer peripheral surface of the first backup ring 41 is damaged by the first pressure release groove 14a.

FIG. 2B is an end view in a state where the filling chamber is depressurized so that the pressure of hydrogen therein is substantially equal to the atmospheric pressure. When the valve body 20 is removed from the mouth ring 12, the filling chamber 15 is depressurized to the atmospheric pressure in advance. Then, since the filling chamber 15 becomes in relatively low pressure, the second backup ring 42 moves axially inward, to be in close contact with the accommodation groove of the valve body 20.

In this state, since the high-pressure hydrogen continues to stay in the sealing region F1 between the O-ring 30 and the first backup ring 41, the first backup ring 41 keeps the state pressed axially outward. Incidentally, when a fuel cell (not shown) generates power, the sealing effect of the second backup ring 42 is smaller than the sealing effect of the first backup ring 41 described above, because the filling chamber 15 is not depressurized instantaneously. Therefore, the sealing region F2 between the O-ring 30 and the second backup ring 42 has a pressure slightly higher than the atmospheric pressure, but the pressure is not so high to interfere with the removal of the valve body 20.

FIG. 3A is an end view in a state where one end of the first pressure release groove 14a faces the accommodation region on the axially inward from the first backup ring 41. That is, FIG. 3A shows a state where the valve body 20 is moved axially outward by a predetermined distance by unscrewing the valve body 20 in the state of FIG. 2B described above. When the valve body 20 is pulled out by the predetermined distance by turning the valve body 20 in the opposite direction when screwing, one end of the first pressure release groove 14a (axial inside end portion) faces the sealing region F1.

In addition, as described above, the axial length of the first pressure release groove 14a is longer than the axial length (thickness) of the backup ring 41. Therefore, as shown in FIG. 3A, there is a state where the first pressure release groove 14a straddles the backup ring 41 in the axial direction in a process of unscrewing the valve body 20.

Then, the sealing region F1 between the O-ring 30 and the first backup ring 41 communicates with the external space via the first pressure release groove 14a, an annular gap between the inner peripheral surface of the mouth ring 12 and the circumferential surface of the valve body 20, and a spiral gap between the female screw part 13 and the male screw part 24. Therefore, the high-pressure hydrogen is discharged and depressurized to the external space of low pressure (atmospheric pressure) relative to the sealing region (see a shaded arrow in FIG. 3A).

FIG. 3B is an end view in a state where the other end of the first pressure release groove 14a faces an accommodation region on the axially outward from a second backup ring 42. When the valve body 20 is further pulled out from the state in FIG. 3A, there is a state where the first pressure release groove 14a straddles the second backup ring 42 in the axial direction as shown in FIG. 3B. Then, the sealing region F2 between the O-ring 30 and the second backup ring 42 communicates with the filling chamber 15 via the first pressure release groove 14a, and the gap between the inner peripheral surface of the mouth ring 12 and the circumferential surface of the valve body 20.

Therefore, if the relatively high-pressure hydrogen exists in the sealing region F2 between the O-ring 30 and the second backup ring 42, the hydrogen is discharged and depressurized to the filling chamber 15 of low pressure (atmospheric pressure) relative to the sealing region F2 (see a shaded arrow in FIG. 3B).

<Advantageous Effects>

The sealing structure 1 according to the present embodiment has the following advantageous effects. That is, in a process of removing the valve body 20 from the tank body 10 (i.e., mouth ring 12), the sealing region F1 and the external space are communicated with each other via the first pressure release groove 14a and the like. By this communication, the high-pressure hydrogen is discharged to the external space via the first pressure release groove 14a and the like.

As a result, since the pressure in the sealing region F1 is substantially equal to the pressure in the external space, the friction force generated when removing the valve body 20 from the mouth ring 12 is very small. In other words, a torque required to overcome the friction force when removing the valve body 20 is very small compared with a case in which the first pressure release grooves 14a, 14b are not provided. Therefore, it is possible to easily remove the valve body 20 from the tank body 10, thereby improving the workability.

Further, it is possible to unscrew the valve body 20 from the mouth ring 12 with the small torque, thereby reliably preventing the female screw part 13 and the male screw part 24 from plastic deformation due to an excessive torque. Furthermore, in the conventional configuration not provided with the pressure release grooves 14a, 14b, since an explosion sound occurs when the high-pressure hydrogen is discharged instantaneously, it has been necessary to alert operators. On the other hand, in the present embodiment, the hydrogen pressure in the accommodation region F becomes substantially equal to the atmospheric pressure in the process of removing the valve body 20 from the mouth ring 12. Therefore, the explosion sound described above does not occur, and the operators can remove the valve body 20 with confidence.

Furthermore, in the present embodiment, the two strips of first pressure release grooves 14a, 14b are formed on the inner peripheral surface of the mouth ring 12 in the axial direction. Therefore, it is enough to scrape away the inner peripheral surface of the mouth ring 12 in the axial direction when the first pressure release grooves 14a, 14b are formed in the manufacturing process of the sealing structure 1, thereby easily forming the first pressure release grooves 14a, 14b.

Second Embodiment

The second embodiment is different from the first embodiment in that the first pressure release grooves 14c, 14d are located axially outward from the accommodation region F, but other parts are the same as the first embodiment. Therefore, the parts different from the first embodiment will be described, and the description of duplicated parts will be omitted.

<Configuration of Sealing Structure>

FIG. 4 is a cross-sectional view taken along a plane including a central axis in a state where a valve body is assembled to a mouth ring in a sealing structure according to the present embodiment. As shown in FIG. 4, in a sealing structure 1A, an inner peripheral surface of the mouth ring 12 is partially formed with two strips of first pressure release grooves 14c, 14d. Hereinafter, one first pressure release groove 14c will be described, but the other first pressure release groove 14d will be the same.

In a state where the valve body 20 and the mouth ring 12 are screwed with each other, both ends of the first pressure release groove 14c are located as follows. That is, one end (axial inside end portion) of the first pressure release groove 14c is located axially outward from the accommodation region F (including a case in which the end is adjacent to the accommodation region F), and the other end of the first pressure release groove 14c is located axially inward from the female screw part 13. Further, the first pressure release groove 14c is formed so that the axial length thereof is longer than the axial length (thickness) of the first backup ring 41.

<Pressure Release Via the First Pressure Release Groove>

In the present embodiment, in the state where the valve body 20 and the mouth ring 12 are screwed with each other, the first pressure release groove 14c is formed to be located axially outward from the accommodation region F. Therefore, in the above state, the inner peripheral surface of the first backup ring 41 is in completely close contact with the circumferential surface of the valve body 20 (that is, over the entire surface and the entire circumference). Then, in a process of pulling out the valve body 20, there is a state in which the first pressure release groove 14c straddles the first backup ring 41. In this state, the external space and the sealing region between the O-ring 30 and the first backup ring 41 are communicated with each other via the first pressure release groove 14c and the like. As a result, the high-pressure hydrogen sealed in the sealing region is discharged and depressurized to the external space via the first pressure release groove 14c and the like.

<Advantageous Effects>

According to the present embodiment, in the state where the valve body 20 and the mouth ring 12 are screwed with each other, the first pressure release groove 14c is formed to be located axially outward from the accommodation region F. Incidentally, in case of the first embodiment, in a state where the high-pressure hydrogen is sealed in the sealing region F1 (see FIG. 2A), a linear area corresponding to the first pressure release groove 14c out of the inner peripheral surface of the first backup ring 41 receives a negative pressure (atmospheric pressure having relatively low pressure).

In contrast, in the present embodiment, the inner peripheral surface of the first backup ring 41 is in completely close contact with the circumferential surface of the valve body 20. Therefore, there is no possibility that the first backup ring 41 receives the partial negative pressure described above. That is, according to the present embodiment, it is possible to prevent the damage of the first backup ring 41 more reliably than the first embodiment.

Third Embodiment

The third embodiment is different from the first embodiment in that the pressure release bores 14e, 14f are provided in place of the first pressure release grooves 14a, 14b described in the first embodiment, but other parts are the same as the first embodiment. Therefore, the parts different from the first embodiment will be described, and the description of duplicated parts will be omitted.

<Configuration of Sealing Structure>

FIG. 5 is a cross-sectional view taken along a plane including a central axis in a state where a valve body is assembled to a mouth ring in a sealing structure according to the present embodiment. As shown in FIG. 5, two pressure release bores 14e, 14f, which are open to the inner peripheral surface of the mouth ring 12 and communicate with the external space, are formed in a sealing structure 1B.

Incidentally, one end of each of the pressure release bores 14e, 14f is open to a region between the accommodation region F and the female screw part 13 of the mouth ring 12 (including a case in which the end is adjacent to the accommodation region F), and the other end of each of the pressure release bores 14e, 14f is open to an end surface of the mouth ring 12 in the axial direction. The two pressure release bores 14e, 14f are formed to be axisymmetric with each other with respect to the central axis, and formed as linear bores gradually opening radially outward as going axially outward.

The inner peripheral surface of the mouth ring 12 is a smooth peripheral wall surface except the one end of each of the pressure release bores 14e, 14f. The pressure release bore 14e is formed at a position where the pressure release bore 14e and the female screw part 13 do not interfere with each other. Hereinafter, one pressure release bore 14e will be described, but the other pressure release bore 14f will be the same.

<Pressure Release Via the Pressure Release Bore>

When the filling chamber 15 is depressurized to an atmospheric pressure, the high-pressure hydrogen is sealed in the sealing region between the O-ring 30 and the first backup ring 41, similarly to FIG. 2A described in the first embodiment. Then, in a process where the valve body 20 is unscrewed from the mouth ring 12, when an opening which is one end (axial inside end portion) of the pressure release bore 14e faces the sealing region, the sealing region and the external space communicate with each other via the pressure release bore 14e. As a result, the high-pressure hydrogen sealed in the sealing region is discharged and depressurized to the external space of relatively low pressure (atmospheric pressure) via the pressure release bore 14e.

<Advantageous Effects>

In the present embodiment, the pressure release bore 14e which is open to the inner peripheral surface of the mouth ring 12 is formed to be adjacent to an axial outside end of the accommodation region F. Therefore, in the process where the valve body 20 is unscrewed from the mouth ring 12, the number of rotations (i.e., angle of rotation around the center axis) until the opening of the pressure release bore 14e faces the sealing region can be reduced. Therefore, an amount of work required before the depressurization is very small, and thereby a load applied to the female screw part 13 and the male screw part 24 is also small.

Further, as with the second embodiment, in a state where the valve body 20 is screwed with the mouth ring 12 and the filling chamber 15 has a high pressure, the outer peripheral surface of the first backup ring 41 is in completely close contact with the inner peripheral surface of the mouth ring 12. Therefore, there is no possibility that the first backup ring 41 receives the partial negative pressure, thereby reliably preventing the damage of the first backup ring 41.

Fourth Embodiment

The fourth embodiment is different from the first embodiment in the shape of the mouth ring 12 and the valve body 20, and in that the second pressure release grooves 14i, 14j are formed on the circumferential surface of the valve body 20.

The fourth embodiment is the same as the first embodiment in that first pressure release grooves 14g, 14h are provided on the inner peripheral surface of the mouth ring 12. Therefore, the parts different from the first embodiment will be described, and the description of duplicated parts will be omitted.

<Configuration of Sealing Structure>

FIG. 6A is a cross-sectional view taken along a plane including a central axis in a state where a valve body is assembled to a mouth ring. Hereinafter, the mouth ring 12 of the tank body 10, the valve body 20, the first pressure release grooves 14g, 14h, and the second pressure release grooves 14i, 14j, will be described sequentially.

<Mouth Ring (Inserted Member)>

As shown in FIG. 6A, the mouth ring 12 of a sealing structure 1C exhibits a cylindrical shape having a substantially step-like inner peripheral surface formed integrally with the filling chamber body 11, and includes a large inner diameter cylinder portion 12a, a step portion 12b, and a small inner diameter cylinder portion 12c. The large inner diameter cylinder portion 12a exhibits a cylindrical shape of predetermined inner and outer diameters. In addition, the large inner diameter cylinder portion 12a has an axially outward inner peripheral surface partially formed with the female screw part 13 for screwing the mouth ring 12 and the valve body 20 with each other.

The large inner diameter cylinder portion 12a has the inner peripheral surface formed with two strips of first pressure release grooves 14g, 14h which are long bores drilled radially outward. Since the first pressure release grooves 14g, 14h are the same as those of the first embodiment, a description thereof will be omitted.

The step portion 12b has an axial outside end portion connected to the large inner diameter cylinder portion 12a and an axial inside end portion connected to the small inner diameter cylinder portion 12c described later. In other word, the step portion 12b is located between the large inner diameter cylinder portion 12a and the small inner diameter cylinder portion 12c, and formed with a step between them. The inner peripheral surface of the step portion 12b includes a tapered surface $12b_1$ and an inner wall surface $12b_2$. The tapered surface $12b_1$ is an inner peripheral surface inclined to be gradually small diameter axially inward (leftward in FIG. 6A). The inner wall surface $12b_2$ is an annular plane extending radially inward from the tapered surface $12b_1$. The small inner diameter cylinder portion 12c is formed integrally with the large inner diameter cylinder portion 12a via the step portion 12b, and exhibits a cylindrical shape of an inner diameter smaller than that of the large inner diameter cylinder portion 12a.

<Valve Body (Insertion Member)>

The valve body 20 exhibits a columnar shape having a substantially step-like side surface, and includes a large diameter column portion 20a, a step portion 20b, and a small diameter column portion 20c. The large diameter column portion 20a exhibits a columnar shape of an outer diameter corresponding to the inner diameter of the large inner diameter cylinder portion 12a (that is, slightly smaller than the inner diameter of the large inner diameter cylinder portion 12a) included in the mouth ring 12. In addition, a male screw part 24 (assembling part) for screwing the mouth ring 12 and the valve body 20 with each other is formed on the outer peripheral surface of the valve body 20.

The step portion 20b has an axial outside end portion connected to the large diameter column portion 20a and an axial inside end portion connected to the small diameter column portion 20c described later. In other word, the step portion 20b is located between the large diameter column portion 20a and the small diameter column portion 20c, and formed with a step between them. The outer peripheral surface of the step portion 20b includes a tapered surface $20b_1$ and a wall surface $20b_2$. The tapered surface $20b_1$ is an outer peripheral surface inclined to be gradually small diameter axially inward. The wall surface $20b_2$ is an annular plane extending radially outward from the tapered surface $20b_1$.

The small diameter column portion 20c is formed integrally with the large diameter column portion 20a via the step portion 20b. The diameter of the small diameter column portion 20c corresponds to the inner diameter of the small inner diameter cylinder portion 12c (that is, slightly smaller than the inner diameter of the small inner diameter cylinder portion 12c) described above. In addition, the outer peripheral surface of the small diameter column portion 20c is formed with two strips of second pressure release grooves 14i, 14j which are long bores drilled radially inward in the axial direction (see FIG. 6B). One end of the second pressure release groove 14i (axial inside end portion) faces the filling chamber 15, and the other end of the second pressure release groove 14i is adjacent to the accommodation region F.

<Others>

The second backup ring 44, the O-ring 30, and the first backup ring 43 are fitted (dropped) sequentially into the mouth ring 12, when the valve body 20 is mounted on the mouth ring 12. Then, from a state where the end portion of the small diameter column portion 20c of the valve body 20 and the end portion of the large inner diameter cylinder portion 12a of the mouth ring 12 face with each other, the valve body 20 is inserted and screwed to the mouth ring 12.

Incidentally, the O-ring 30 is in contact with the end portion (then, the inner peripheral surface) of the large inner diameter cylinder portion 12a and elastically deformed radially, so that the O-ring 30 functions as a guide when the valve body 20 is inserted. Then, an annular accommodation region F is formed in a state where the mouth ring 12 and the valve body 20 are coaxially assembled, and the first backup ring 43, O-ring 30, and the second backup ring 44 are accommodated in the accommodation region F.

Note that the shape of the first backup ring 43 is different from the shape of the first backup ring 41 described in the first embodiment. That is, the first backup ring 43 shown in FIG. 6A includes an inner peripheral surface of a diameter which becomes gradually small as going axially inward, and an outer peripheral surface of an outer diameter substantially constant in the axial direction. The shape of the second backup ring 44 is the same as the second backup ring 42 described in the first embodiment.

<Pressure Release Via the First and Second Pressure Release Grooves>

Figure 7A:
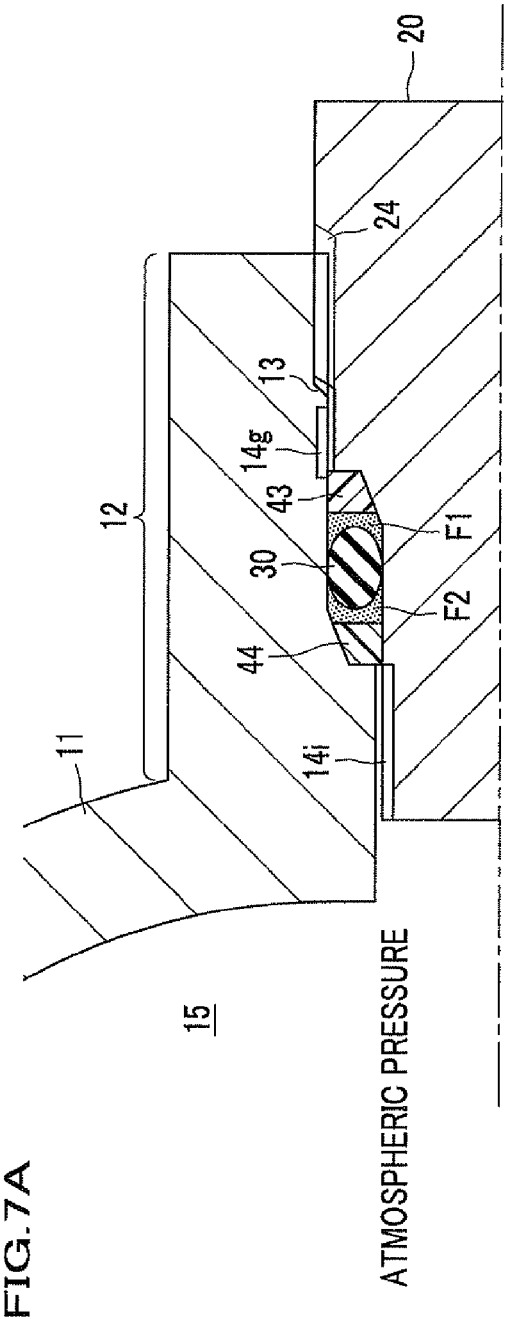
FIG. 7A is an end view taken along the plane including the central axis in the state where the valve body is assembled to the mouth ring.

FIG. 7A is an end view taken along the plane including the central axis in the state where the valve body is assembled to the mouth ring. Here, FIG. 7A shows a state where the filling chamber 15 is depressurized to the atmospheric pressure (that is, the state just before the valve body 20 is removed). The high-pressure hydrogen is sealed in the sealing region F1 (see FIG. 7A) between the O-ring 30 and the first backup ring 43, for the same reason as the first embodiment. Further, the hydrogen is sealed in the sealing region F2 (see FIG. 7B) between the O-ring 30 and the second backup ring 44.

Figure 7B:
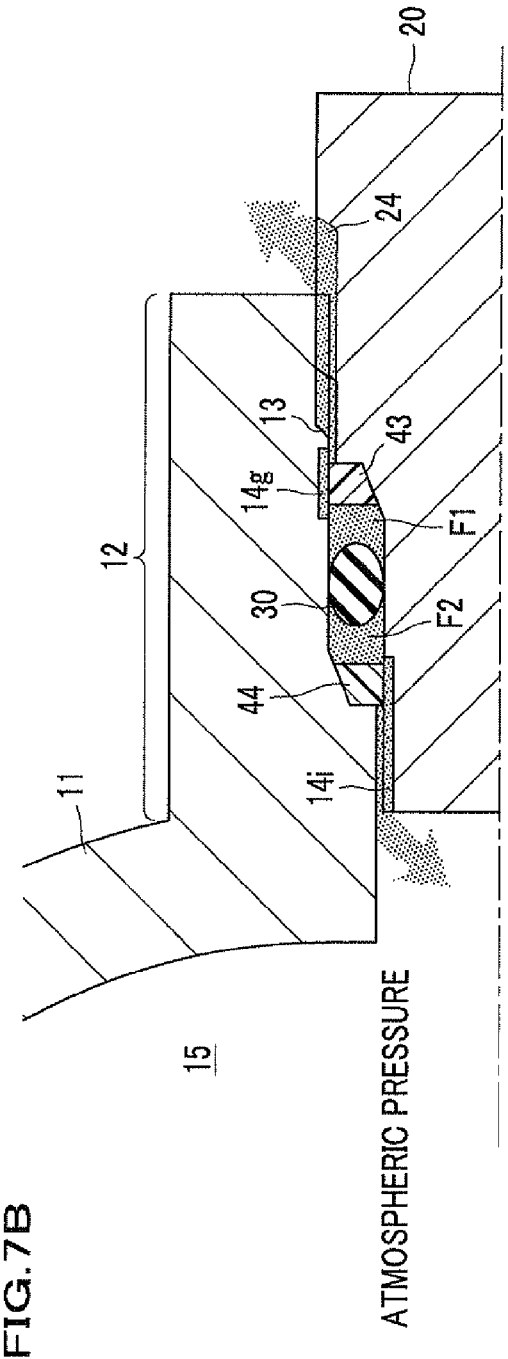
FIG. 7B is an end view taken along the plane including the central axis in the state where the valve body is pulled out from the mouth ring by a predetermined distance.

FIG. 7B is an end view taken along the plane including the central axis in the state where the valve body is pulled out from the mouth ring by a predetermined distance. In a process where the valve body 20 is pulled out from the mouth ring 12, there is a state in which the first pressure release groove 14g straddles the first backup ring 43. Then, similarly to the first embodiment, the high-pressure hydrogen sealed in the sealing region F1 is discharged and depressurized to the external space via the first pressure release groove 14g and the like (see a shaded arrow in FIG. 7B).

Further, in the state shown in FIG. 7B, one end (axial inside end portion) of the second pressure release groove 14i faces the filling chamber 15, and the other end of the second pressure release groove 14i faces the sealed region F2. Therefore, the sealed region F2 communicates with the filling chamber 15 via the second pressure release groove 14i. As a result, if relatively high-pressure hydrogen is sealed in the sealing region F2, the hydrogen is discharged and depressurized to the filling chamber 15 via the second pressure release groove 14i (see a shaded arrow in FIG. 7B).

<Advantageous Effects>

According to the present embodiment, it is possible to discharge the high-pressure hydrogen sealed in the sealing region F1 (see FIG. 7B) to the external space via the first pressure release grooves 14g, 14h, and the like, by forming the first pressure release grooves 14g, 14h on the inner peripheral surface of the mouth ring 12. Further, it is possible to discharge the relatively high-pressure hydrogen sealed in the sealing region F2 (see FIG. 7B) to the filling chamber 15 via the second pressure release grooves 14i, 14j by forming the second pressure release grooves 14i, 14j on the outer peripheral surface of the valve body 20.

By depressurizing the sealing regions F1, F2 in this manner, the friction force generated when removing the valve body 20 from the mouth ring 12 is very small, because the pressures in the sealing regions F1, F2 (see FIG. 7B) located on the both sides of the O-ring 30 in the axial direction are substantially equal to the atmospheric pressure. Therefore, the torque required to remove the valve body 20 from the mouth ring 12 is very small, thereby preventing the female screw part 13 and the male screw part 24 from plastic deformation due to an excessive torque. Furthermore, when removing the valve body 20 from the mouth ring 12, it is possible to reliably prevent the explosion sound from occurring.

Further, when the first backup ring 43, the O-ring 30, and the second backup ring 44 are mounted on the mouth ring 12, these can be directly fitted into the mouth ring 12. Furthermore, the O-ring 30 is elastically deformed radially, so that the O-ring 30 functions as a guide when the valve body 20 is inserted. Therefore, it is possible to easily assemble these members and prevent the inner peripheral surface of the mouth ring 12 and the outer peripheral surface of the valve body 20 from being damaged by their contact with each other.

<<Modification>>

Hereinabove, although the sealing structure according to the present invention has been described by each embodiment, the embodiments of the present invention are not limited to these, but various modifications can be applied to the embodiments. For example, in the above embodiments, two strips of first pressure release grooves 14a, 14b, two strips of second pressure release grooves 14i, 14j, or two strips of pressure release bores 14e, 14f are described in each case, but the number of the grooves or bores are not limited to this. In other words, grooves such as a first pressure release groove 14a may be provided one, or three or more.

Further, in the above embodiments, the backup rings 41, 42 having a trapezoidal sectional side view are described, but the shape of the sectional side view is not limited to this. In other words, for example, the backup rings having a sectional side view of rectangular or triangular shape can be used. Furthermore, in the above embodiments, the backup rings 41, 42 provided on both sides of the O-ring 30 are described, but the arrangement is not limited to this. For example, only the first backup ring 41 provided on the axially outward of the O-ring 30 may be used by omitting the second backup ring 42 provided on the axially inward of the O-ring 30.

Further, in the fourth embodiment, a case in which the valve body 20 includes the small diameter column portion 20c having the outer peripheral surface formed with the second pressure release grooves 14i, 14j is described, the second pressure release grooves 14i, 14j can be omitted. As described above, although the high-pressure hydrogen stays in the sealing region F1 (see FIG. 7A) between the O-ring 30 and the first backup ring 43, the sealing region F2 between the O-ring 30 and the second backup ring 44 does not become in so high pressure. In other words, even if the hydrogen is sealed in the sealing region F2 between the O-ring 30 and the second backup ring 44 by omitting the second pressure release grooves 14i, 14j, there is no problem to remove the valve body 20.

Further, in the above embodiments, cases in which the mouth ring 12 is secured to the valve body 20 by screwing are described, but the securing method is not limited to this. For example, the mouth ring 12 and the valve body 20 are drilled to be formed with bores in which a pin is inserted, and the valve body 20 is fitted into the mouth ring 12, and then it may be configured that the relative position thereof is secured by inserting the pin into the bores penetrating these components.

In this case, the valve body 20 and the mouth ring 12 have the assembling parts to be fitted with each other when they are assembled, and the first pressure release groove is formed to extend at least to the inner peripheral surface of the mouth ring 12 between the assembling part and the accommodation region F. Incidentally, the first pressure release groove may be provided so as to avoid the bore on the inner peripheral of the mouth ring 12, and extended to the end portion of the axially outward of the mouth ring 12.

Further, the above embodiments may be combined appropriately. For example, by combining the third embodiment and the fourth embodiment, the second pressure release groove may be formed on the outer peripheral surface of the valve body 20, while the pressure release bore is formed to open to the inner peripheral surface of the mouth ring 12.

REFERENCE SIGNS LIST 1, 1A, 1B, 1C: sealing structure
10: tank body
11: filling chamber body
12: mouth ring (inserted member)
12a: large inner diameter cylinder portion
12b: step portion
12c: small inner diameter cylinder portion
13: female screw part (assembling part)
14a, 14b, 14c, 14d, 14g, 14h: first pressure release groove
14i, 14j: second pressure release groove
14e, 14f: pressure release bore
15: filling chamber
20: valve body (insertion member)
24: male screw part (assembling part)
30: O-ring
41, 43: first backup ring (backup ring)
42, 44: second backup ring (backup ring)
F: accommodation region
F1, F2: sealing region

The invention claimed is:

1. A sealing structure comprising:
    an insertion member having a columnar outer shape;
    a cylindrical inserted member that is formed integrally with a filling chamber body in which a fluid is filled, and inserted with the insertion member;
    an O-ring that is accommodated in an accommodation region formed by an inner peripheral surface of the inserted member and an outer peripheral surface of the insertion member, and prevents the fluid from leaking, in a state where the insertion member is inserted into the inserted member and assembled coaxially with the inserted member; and
    one or two backup rings which are accommodated on both sides or axially outward of the O-ring in the accommodation region, and restrict a movement of the O-ring, wherein
    the insertion member and the inserted member are partially formed with assembling parts to be fitted or screwed to each other when they are assembled, and
    a first pressure release groove is formed in the axial direction so as to extend at least on the inner peripheral surface of the inserted member between the assembling part and the accommodation region, and communicates with an external space via a gap between the assembling parts.

2. The sealing structure as set forth in claim 1, wherein one end of the first pressure release groove is adjacent to the accommodation region, in the state where the insertion member is inserted into the inserted member and assembled coaxially with the inserted member.

3. A sealing structure comprising:
    an insertion member having a columnar outer shape;
    a cylindrical inserted member that is formed integrally with a filling chamber body in which a fluid is filled, and inserted with the insertion member;
    an O-ring that is accommodated in an accommodation region formed by an inner peripheral surface of the inserted member and an outer peripheral surface of the insertion member, and prevents the fluid from leaking, in a state where the insertion member is inserted into the inserted member and assembled coaxially with the inserted member; and
    one or two backup rings which are accommodated on both sides or axially outward of the O-ring in the accommodation region, and restrict a movement of the O-ring, wherein
    the insertion member and the inserted member are partially formed with assembling parts to be fitted or screwed to each other when they are assembled, and
    a pressure release bore is formed so as to open to the inner peripheral surface of the inserted member between the assembling part and the accommodation region, and communicate with an external space.

4. The sealing structure as set forth in claim 3, wherein the opening of the pressure release bore is adjacent to the accommodation region, in the state where the insertion member is inserted into the inserted member and assembled coaxially with the inserted member.

5. The sealing structure as set forth in claim 1, wherein
    the insertion member includes a large diameter column portion and a small diameter column portion that is formed integrally with the large diameter column portion via a step portion and has a smaller diameter than the large diameter column portion,
    the inserted member includes a large inner diameter cylinder portion of an inner diameter corresponding to a diameter of the large diameter column portion and a small inner diameter cylinder portion that is formed integrally with the large inner diameter cylinder portion via a step portion and has an inner diameter corresponding to a diameter of the small diameter column portion,
    the accommodation region is formed in a state where the insertion member is inserted into the inserted member and assembled coaxially with the inserted member, from a state where an end portion of the small diameter column portion of the insertion member and an end portion of the large inner diameter cylinder portion of the inserted member face each other, and
    a second pressure release groove that has one end thereof facing the inside of the filling chamber body and the other end thereof provided on the axially inward from the accommodation region, is formed in the axial direction on the outer peripheral surface of the small diameter column portion of the insertion member.

* * * * *